US 11,527,935 B2

United States Patent
Kobayashi

(10) Patent No.: US 11,527,935 B2
(45) Date of Patent: Dec. 13, 2022

(54) ON-VEHICLE BRUSHLESS MOTOR DEVICE AND METHOD OF MANUFACTURING THE SAME

(71) Applicant: MIKUNI CORPORATION, Tokyo (JP)

(72) Inventor: Tadashi Kobayashi, Takizawa (JP)

(73) Assignee: MIKUNI CORPORATION, Tokyo (JP)

( * ) Notice: Subject to any disclaimer, the term of this patent is extended or adjusted under 35 U.S.C. 154(b) by 238 days.

(21) Appl. No.: 16/893,847

(22) Filed: Jun. 5, 2020

(65) Prior Publication Data

US 2021/0013762 A1 Jan. 14, 2021

(30) Foreign Application Priority Data

Jul. 10, 2019 (JP) .............................. JP2019-128629

(51) Int. Cl.
*H02K 21/16* (2006.01)
*H02K 3/52* (2006.01)
*H01R 4/02* (2006.01)
*H02K 15/00* (2006.01)

(52) U.S. Cl.
CPC ............ *H02K 3/522* (2013.01); *H01R 4/023* (2013.01); *H02K 15/0062* (2013.01); *H02K 21/16* (2013.01)

(58) Field of Classification Search
CPC .... H02K 3/522; H02K 21/16; H02K 15/0062; H02K 11/33; H02K 3/52; H02K 1/146; H02K 15/02; H02K 1/185; H02K 15/022; H02K 15/095; H02K 3/38; H02K 1/187; H01R 4/023
See application file for complete search history.

(56) References Cited

U.S. PATENT DOCUMENTS

| | | | |
|---|---|---|---|
| 9,742,239 B2* | 8/2017 | Yoneda | H02K 5/10 |
| 10,938,262 B2* | 3/2021 | Hattori | H02K 11/33 |
| 2016/0094106 A1* | 3/2016 | Yamasaki | H01R 12/57 |
| | | | 310/71 |
| 2016/0336831 A1* | 11/2016 | Horizumi | H02K 11/33 |

FOREIGN PATENT DOCUMENTS

| | | |
|---|---|---|
| JP | 2007074838 A | 3/2007 |
| JP | 2017015002 A | 1/2017 |
| JP | 2019068606 A | 4/2019 |

OTHER PUBLICATIONS

Extended European Search Report issued in European Appln. No. 20180402.8 dated Sep. 28, 2020.

* cited by examiner

*Primary Examiner* — Leda T Pham
(74) *Attorney, Agent, or Firm* — Rossi, Kimms & McDowell LLP

(57) ABSTRACT

To provide an on-vehicle brushless motor device capable of being downsized with respect to an axial direction of a rotor and a method of manufacturing the same. The on-vehicle brushless motor device 1 includes a brushless motor 10 and an electronic substrate 30. The brushless motor 10 includes a rotor 12 and a stator 16 including a plurality of coils 18 arranged around the rotor 12. The electronic substrate 30 is arranged on a side opposite to an output side of the brushless motor 10 along a plane P intersecting an axial direction X. The on-vehicle brushless motor device 1 further includes a soldering portion 40 that connects a coil wire 20 of the coil 18 and the electronic substrate 30.

9 Claims, 8 Drawing Sheets

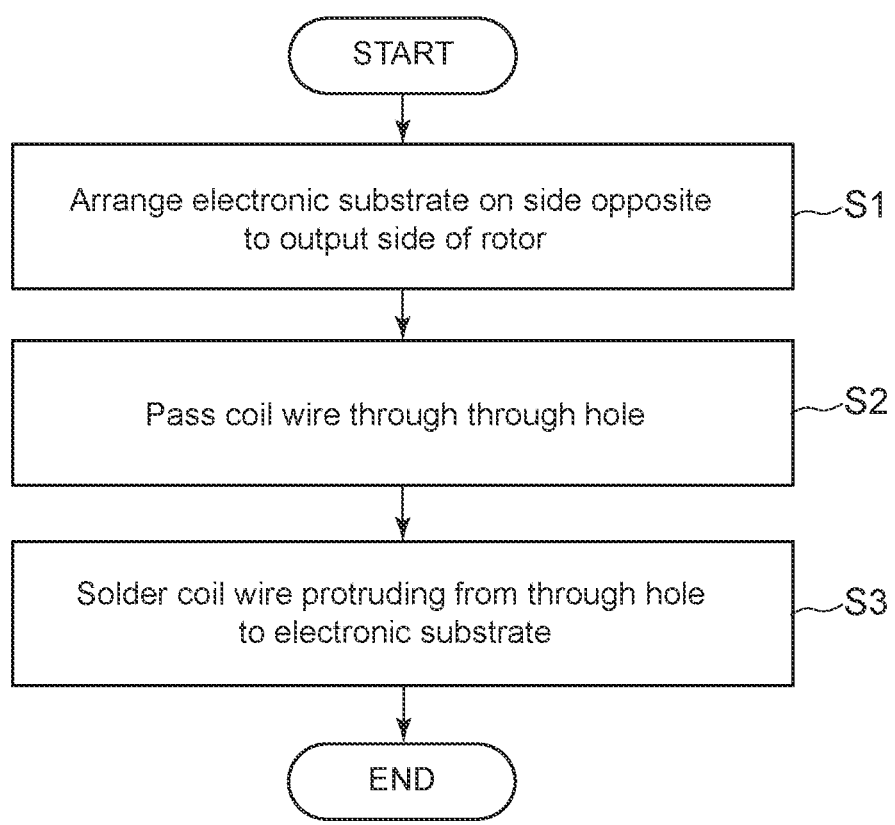

ON-VEHICLE BRUSHLESS MOTOR DEVICE AND METHOD OF MANUFACTURING THE SAME

TECHNICAL FIELD

The present disclosure relates to a brushless motor device mounted on a vehicle (hereinafter, called an on-vehicle brushless motor device) and a method of manufacturing the same.

BACKGROUND

In recent years, various brushless motors have been developed which do not use mechanical contacts such as brushes and commutators. For example, Patent Document 1 discloses a configuration related to a pump device including a brushless motor.

CITATION LIST

Patent Literature

Patent Document 1: Japanese Patent Application Laid-open No. 2017-15002

SUMMARY

By the way, an electric actuator to be mounted on a vehicle is desired to be miniaturized due to limitation of a space for mounting the electric actuator. However, in the pump device described in Patent Document 1, a driving coil and a circuit board are connected to each other through a terminal pin arranged along an axial direction of a rotor by soldering one end of the terminal pin having the other end electrically connected to the driving coil to the circuit board. Therefore, in the axial direction of the rotor, it is required to secure a space for soldering the terminal pin to the circuit board in addition to a space for arranging the terminal pin. Thus, it is difficult to reduce the size of the entire pump device in the axial direction of the rotor. Patent Document 1 does not disclose any solution for solving such a problem.

In view of the foregoing, it is an object of at least one embodiment of the present disclosure to provide an on-vehicle brushless motor device that can be miniaturized in the axial direction of the rotor and a method of manufacturing the same.

(1) An on-vehicle brushless motor device according to at least one embodiment of the present invention includes a brushless motor including a rotor and a stator which includes a plurality of coils arranged around the rotor, and an electronic substrate arranged on a side opposite to an output side of the brushless motor along a plane intersecting an axial direction of the rotor. Here, the on-vehicle brushless motor device further includes a soldering portion which connects a coil wire of the coil and the electronic substrate.

(2) In some embodiments, in the on-vehicle brushless motor device described above as (1), the on-vehicle brushless motor device may further include a holder unit including a connector terminal for connecting the electronic substrate and an external device, and a holder disposed between the electronic substrate and the brushless motor to support the electronic substrate.

(3) In some embodiments, in the on-vehicle brushless motor device described above as (2), the electronic substrate may include a through hole penetrating the electronic substrate in the axial direction, and the holder may include a guide hole for guiding the coil wire from the brushless motor side to the through hole of the electronic substrate.

(4) In some embodiments, in the on-vehicle brushless motor device described above as (3), the guide hole may include a tapered passage portion formed such that a hole diameter decreases as a distance from the rotor increases in the axial direction.

(5) In some embodiments, in the on-vehicle brushless motor device described above as (4), the guide hole may include a substrate-side passage portion connecting an opening end of the guide hole on the electronic substrate side and the tapered passage portion, and the substrate-side passage portion may have a passage diameter that is uniform in the axial direction.

(6) In some embodiments, in the on-vehicle brushless motor device described above as any one of (3) to (5), the diameter of the opening end of the guide hole on the electronic substrate side may be smaller than the diameter of the through hole.

(7) In some embodiments, in the on-vehicle brushless motor device described above as any one of (3) to (6), the soldering portion may connect the coil wire arranged to protrude from the through hole of the electronic substrate on a side opposite to the rotor and an inner peripheral surface of the through hole.

(8) In some embodiments, in the on-vehicle brushless motor device described above as any one of (3) to (6), the electronic substrate may include a metal foil terminal portion disposed adjacent to the through hole, and the soldering portion may connect the metal foil terminal portion and the coil wire passing through the through hole and disposed along the metal foil terminal portion.

(9) In some embodiments, in the on-vehicle brushless motor device described above as any one of (3) to (6), the electronic substrate may include a metal foil terminal portion disposed on a surface of the electronic substrate opposite to the rotor, and a resist, which is disposed on the metal foil terminal portion, including a first opening portion through which the coil wire penetrates along the axial direction and a second opening portion provided separate from the first opening portion and causing at least a part of the metal foil terminal portion to be exposed therethrough, and the soldering portion may connect the metal foil terminal portion and the coil wire via the second opening portion.

(10) A method of manufacturing an on-vehicle brushless motor device according to at least one embodiment of the present invention includes steps of arranging an electronic substrate on a side opposite to an output side of a brushless motor along a plane intersecting an axial direction of a rotor of the brushless motor, passing a coil wire of a coil constituting a stator of the brushless motor through a through hole of the electronic substrate, and soldering the coil wire protruding from the through hole to the electronic substrate.

According to at least one embodiment of the present disclosure, it is possible to provide an on-vehicle brushless motor device which can be miniaturized in the axial direction of the rotor and a method of manufacturing the same.

BRIEF DESCRIPTION OF DRAWINGS

FIG. 8 is a flowchart illustrating a method of manufacturing an on-vehicle brushless motor device according to an embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Further, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
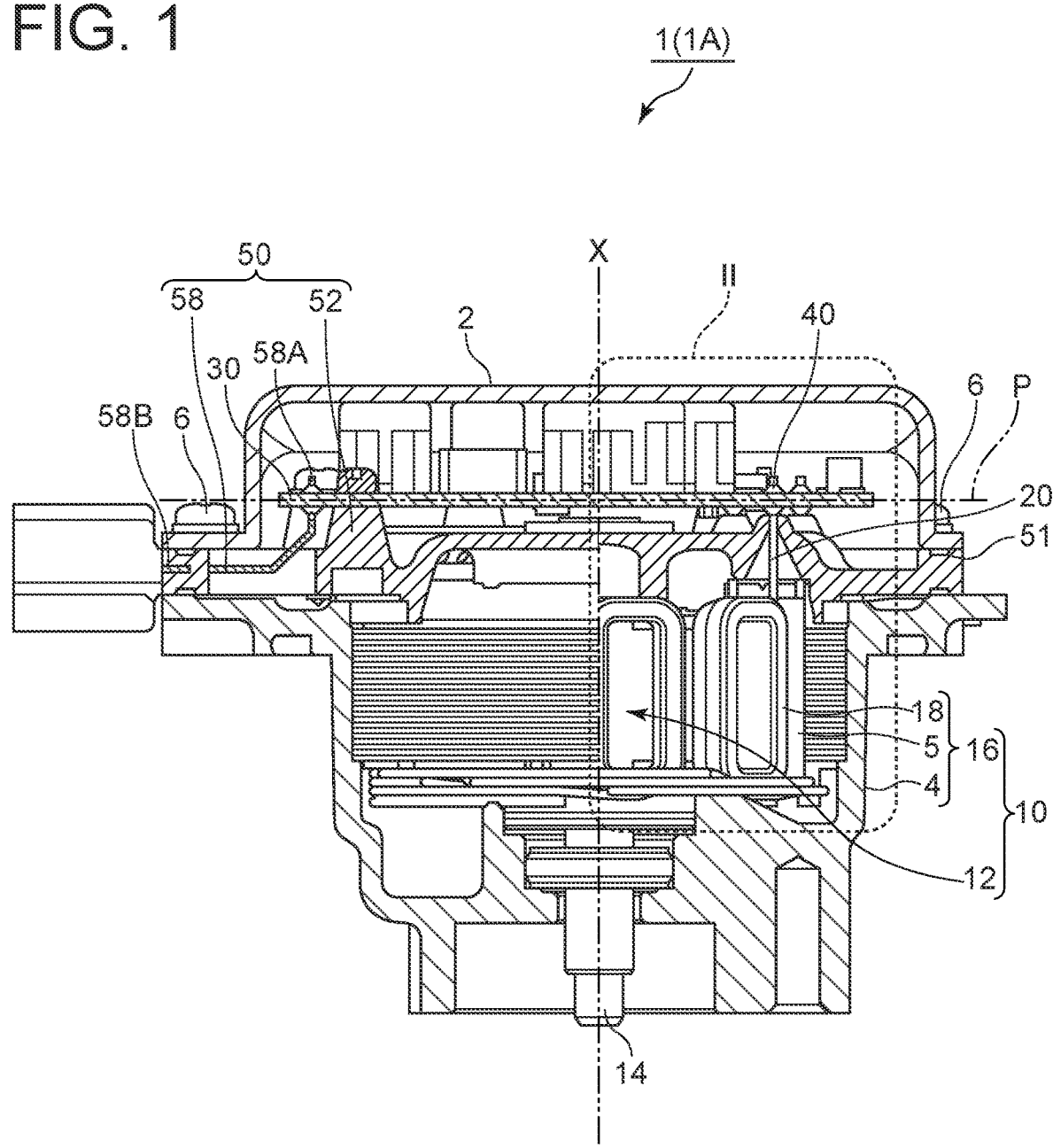
FIG. 1 is a view schematically illustrating a configuration example of an on-vehicle brushless motor device according to an embodiment of the present disclosure.
Figure 2A:
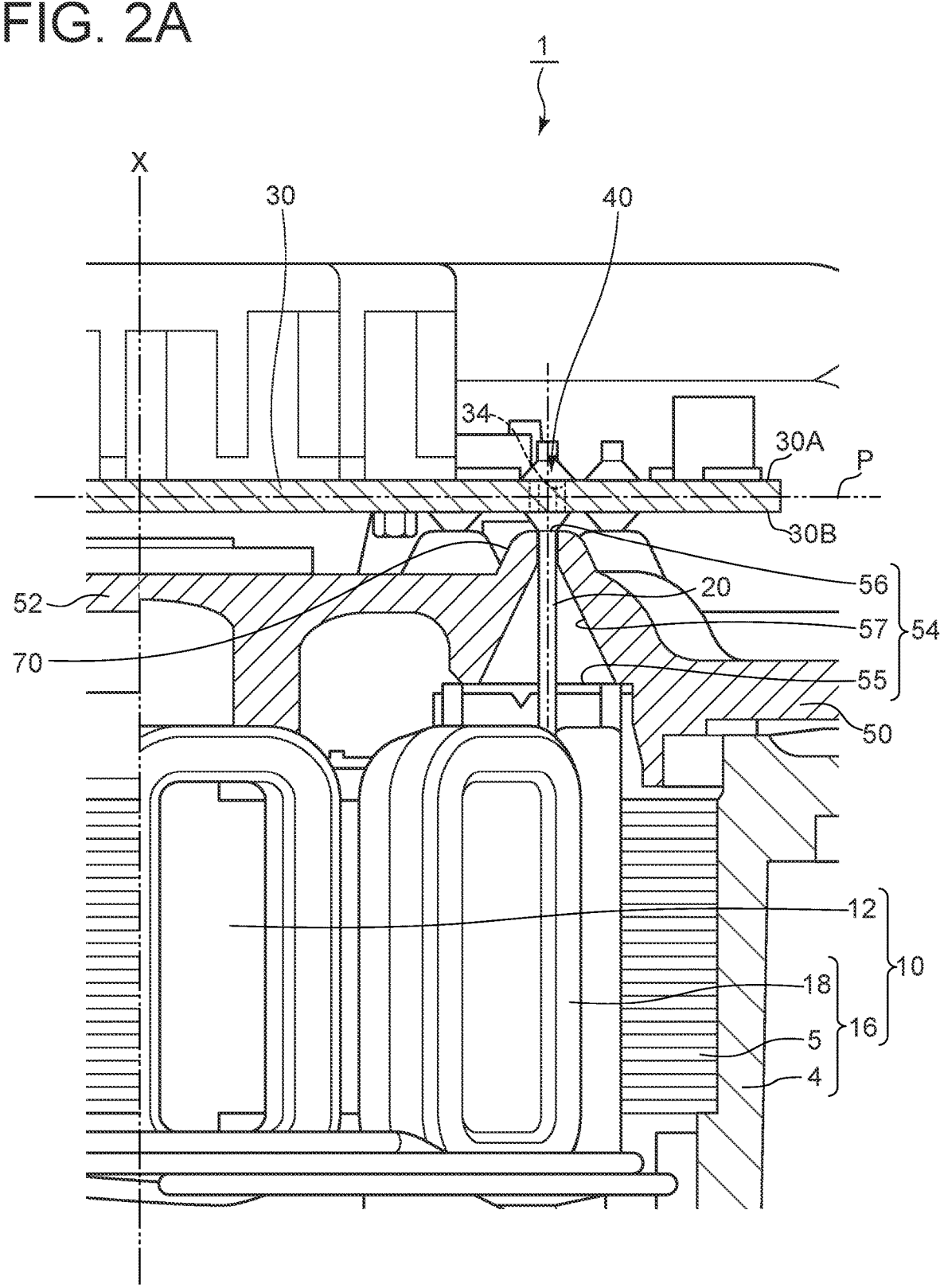
FIG. 2A is a partial enlarged view illustrating a region II indicated by a broken line in FIG. 1.

First, description will be provided on a schematic configuration of an on-vehicle brushless motor device 1 according to an embodiment of the present disclosure. FIG. 1 is a view schematically illustrating a configuration example of the on-vehicle brushless motor device 1 according to an embodiment of the present disclosure. FIG. 2A is a partial enlarged view illustrating a region II illustrated by a broken line in FIG. 1.

As illustrated in FIGS. 1 and 2A, the on-vehicle brushless motor device 1 is mounted, for example, on a vehicle as an electric oil pump (EOP) that is an electric oil supply device to supply oil for lubrication, cooling, or working fluid to an engine, a clutch, or the like. The on-vehicle brushless motor device 1 includes a brushless motor 10 that does not use a mechanical contact such as a brush or a commutator, and an electronic substrate 30 for controlling driving of the brushless motor 10.

The brushless motor 10 is an inner rotor type brushless motor including, for example, a rotor 12 and a stator 16 including a plurality of coils 18 arranged around the rotor 12.

Figure 2B:
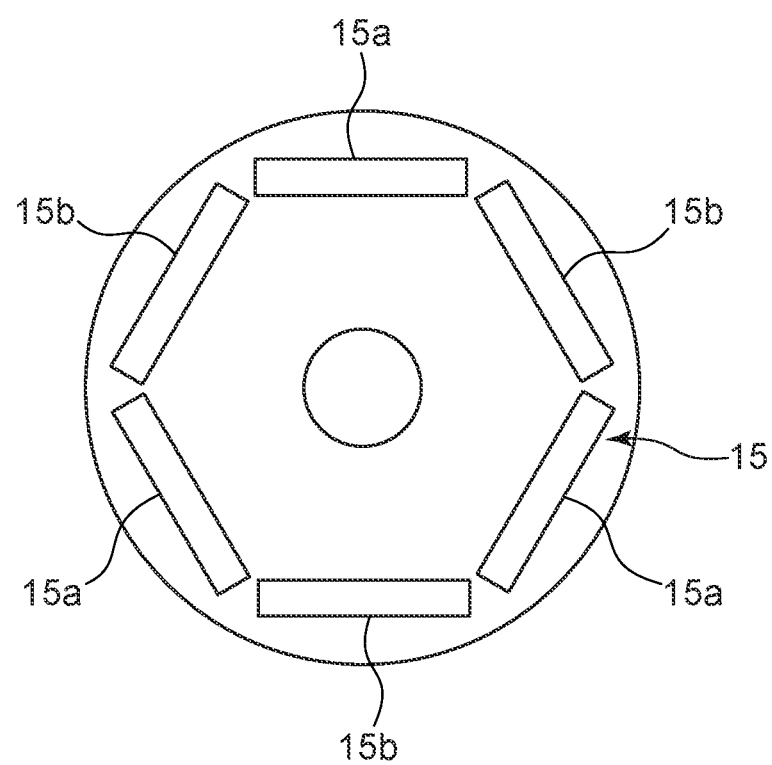
FIG. 2B is a view illustrating an example of arrangement of magnets.

The rotor 12 is arranged inside the stator 16 and formed, in a coaxial manner, of an output shaft 14 (rotary shaft), a cylindrical rotor core (not illustrated) arranged in the outer circumference of the output shaft 14, and a ring-shaped magnet 15 (see FIG. 2B) magnetized in multiple poles (e.g., six poles) and fixed to the rotor core along the outer circumference thereof. In the exemplary embodiment illustrated in FIG. 2B, plate-like S-pole magnet portions 15a and plate-like N-pole magnet portions 15b are alternately arranged in the circumferential direction, and six magnet portions 15a and 15b (three magnet portions 15a and three magnet portions 15b) are arranged to form a substantially hexagonal shape when viewed in the axial direction of the rotor 12. A pump rotor (not illustrated) such as a gear (not illustrated) for transporting oil is connected to the output shaft 14 to be rotatable together with the output shaft 14.

Hereinafter, the axial direction of the rotor 12 is referred to as an "axial direction X". In addition, a direction from the electronic substrate 30 toward the brushless motor 10 (a direction from the opposite side to the output side of the brushless motor 10 toward the output side of the brushless motor 10) in the axial direction X is referred to as "downward direction" or simply "downward", and a direction from the brushless motor 10 toward the electronic substrate 30 (a direction from the output side of the brushless motor 10 toward the opposite side to the output side of the brushless motor 10) in the axial direction X is referred to as "upward direction" or simply "upward".

The stator 16 includes a housing (motor case) 4 also serving as a yoke, a plurality of stator cores (core members) 5 fixed to an inner peripheral side of the housing 4, and the plurality of coils 18 each wound around the plurality of stator cores 5. The housing 4 is made of metal such as iron and has a bottomed cylindrical shape. A holder unit 50 (described later) made of, for example, synthetic resin is attached to an opening of the housing 4. The electronic substrate 30 is attached to an upper portion of the holder unit 50, and an upper portion of the electronic substrate 30 is covered with a top cover 2. The housing 4, the holder unit 50, and the top cover 2 are fixed by screws 6. Each coil 18 is formed by winding a conductive metal wire such as copper around the stator core 5 a plurality of times.

The electronic substrate 30 is disposed along a plane P intersecting the axial direction X on the side opposite to the output side of the brushless motor 10. In the illustrated exemplary embodiment, the plane P is orthogonal to the axial direction X. The electronic substrate 30 is a so-called printed circuit board (PCB), and is a printed-circuit board configured by mounting various electronic components on a printed wiring board (PWB) such as a glass epoxy substrate formed of a fiber-reinforced resin obtained by hardening cloth woven using glass fibers or the like with an epoxy resin. The printed wiring board may be, for example, a composite substrate in which paper and a glass substrate are mixed, a flexible substrate, or a ceramic substrate.

The on-vehicle brushless motor device 1 further includes a soldering portion 40 that connects a coil wire 20 of the coil 18 and the electronic substrate 30. That is, the soldering portion 40 electrically connects the electronic substrate 30 and an end portion of the coil wire 20 or the vicinity thereof on the opposite side to the output side of the brushless motor 10. For example, in the electronic substrate 30, the soldering portion 40 may be arranged on a surface opposite to the coil 18 and the rotor 12 with respect to the electronic substrate 30 in the axial direction X (that is, the upper surface 30A of the electronic substrate 30).

Here, an on-vehicle electric oil pump to which the on-vehicle brushless motor device 1 is applied may be disposed adjacent to a drive shaft or the like in the axial direction X. Therefore, if the on-vehicle brushless motor device 1 can be downsized in the axial direction X, it is possible to avoid interference with a movable portion such as a drive shaft, and the degree of freedom of design is improved.

In this regard, according to the configuration of the present disclosure described above, the electronic substrate 30 disposed on the side opposite to the output side of the brushless motor 10 and the coil wire 20 are directly connected to each other by the soldering portion 40. Therefore, the distance between the electronic substrate 30 and the winding portion of the coil 18 can be reduced as compared with the case where the coil and the electronic substrate are connected to each other via a rigid terminal component such as a terminal pin, for example, and it is possible to provide the on-vehicle brushless motor device 1 that can be downsized in the axial direction X. In addition, the number of welding points can be reduced as compared with the case where the coil and the electronic substrate are connected to each other via a rigid terminal component such as a terminal pin. Therefore, it is possible to provide the on-vehicle brushless motor device 1 with improved assemblability.

In some embodiments, for example, as illustrated in FIGS. 1 and 2A, the on-vehicle brushless motor device 1 described above may further include the holder unit 50 including a connector terminal 58 (see FIG. 1) for connecting the electronic substrate 30 and an external device (not illustrated), and a holder 52 disposed between the electronic substrate 30 and the brushless motor 10 to support the electronic substrate 30.

The holder 52 functions as a partition member that partitions a space in which the brushless motor 10 is disposed and a space in which the electronic substrate 30 is disposed, and also functions as a support portion that rotatably supports the output shaft 14 of the brushless motor 10 via a bearing (not illustrated). The holder 52 is made of resin, and for example, may be formed by insert molding. For example, as illustrated in FIG. 1, the holder 52 includes a groove portion 51 formed along the outer circumference of the holder 52 in the peripheral edge portion on the upper surface side. By filling the adhesive in the groove portion 51, it is possible to ensure airtightness between the space in which the electronic substrate 30 is disposed and the outside of the on-vehicle brushless motor device 1.

The connector terminal 58 is formed integrally with the holder 52 by embedding a part of the connector terminal 58 in the holder 52. For example, the holder unit 50 is formed by insert-molding the holder 52 with a part of the connector terminal 58 embedded therein. One end 58A of the connector terminal 58 is provided to protrude upward from the upper surface of the holder 52, and is connected to the electronic substrate 30 disposed above by soldering, for example. The other end 58B of the connector terminal 58 is provided in a state of projecting, for example, in the horizontal direction from the peripheral edge portion of the holder 52. The connector terminal 58 is a conductive member formed of a metal such as copper, for example, and the other end 58B thereof is connected to an external device (not illustrated), thereby electrically connecting the electronic substrate 30 and the external device. Note that the other end 58B of the connector terminal 58 may be provided to protrude upward or downward from the peripheral edge portion of the holder 52, for example, in accordance with the relative arrangement with the external device to be connected.

According to the on-vehicle brushless motor device 1, since the holder unit 50 in which the holder 52 and the connector terminal 58 are integrally formed is provided between the electronic substrate 30 and the brushless motor 10, it is possible to provide the on-vehicle brushless motor device 1 in which the electronic substrate 30 and the external device can be easily connected to each other while the electronic substrate 30 arranged on the opposite side to the rotor 12 with respect to the holder unit 50 is supported by the holder 52 and which is easy to be assembled.

In some embodiments, for example, as illustrated in FIGS. 1 and 2A, in the on-vehicle brushless motor device 1 including the holder unit 50 described above, the electronic substrate 30 may include a through hole 34 that penetrates the electronic substrate 30 in the axial direction X, and the holder 52 may include a guide hole 54 for guiding the coil wire 20 from the brushless motor 10 side to the through hole 34 of the electronic substrate 30.

The through hole 34 is formed from the lower surface 30B side to the upper surface 30A side of the electronic substrate 30. The cross-sectional shape of the through hole 34 orthogonal to the axial direction X is formed, for example, in a circular shape. The guide hole 54 is formed to penetrate the holder 52 in the axial direction X from the lower surface side to the upper surface side of the holder 52. The cross-sectional shape of the guide hole 54 orthogonal to the axial direction X is formed, for example, in a circular shape. The guide hole 54 is formed such that a substrate-side opening end 56, which is an opening end of the guide hole 54 on the electronic substrate 30 side (upper side), overlaps the through hole 34 as viewed in the axial direction X (more specifically, such that the substrate-side opening end 56 is accommodated inside the through hole 34 as viewed in the axial direction X).

According to the on-vehicle brushless motor device 1, since the holder 52 includes the guide hole 54, the coil wire 20 can be guided upward from the brushless motor 10 side (lower side) of the holder 52, and further, the coil wire 20 can be guided to the through hole 34 of the electronic substrate 30. Therefore, for example, one end of the coil wire 20, which is relatively flexible and indefinite in shape compared to a rigid terminal member such as a terminal pin, can be smoothly guided to the through hole 34 of the electronic substrate 30. Therefore, it is possible to provide the on-vehicle brushless motor device 1 with improved assemblability. Further, as described later, various soldering positions and configurations can be adopted, thereby improving the degree of freedom of the soldering method. Here, by removing the insulating film of the coil wire 20 of the coil 18 in advance, soldering is facilitated.

Figure 3:
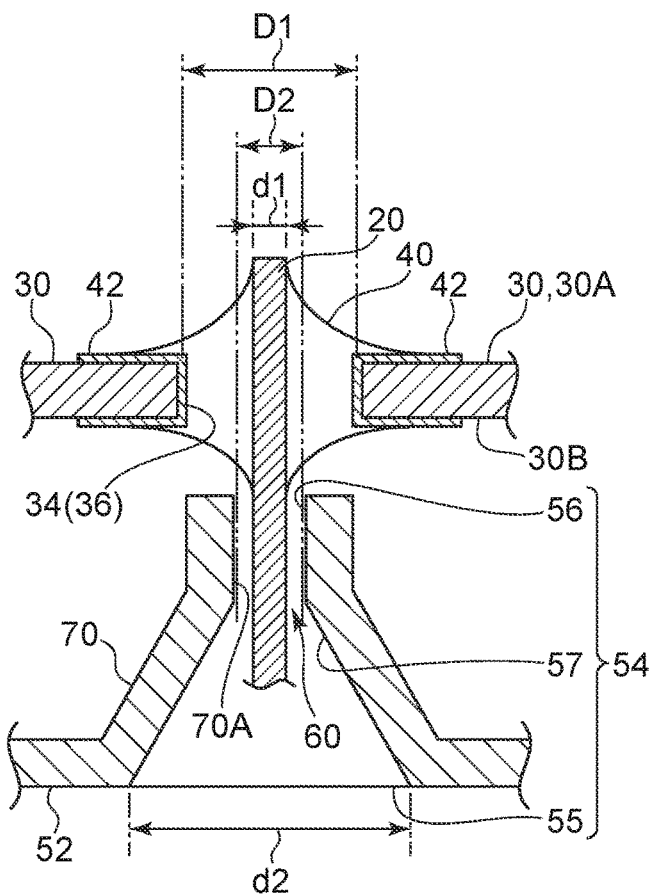
FIG. 3 is a side sectional view illustrating a configuration example of a guide hole according to an embodiment.
Figure 4:
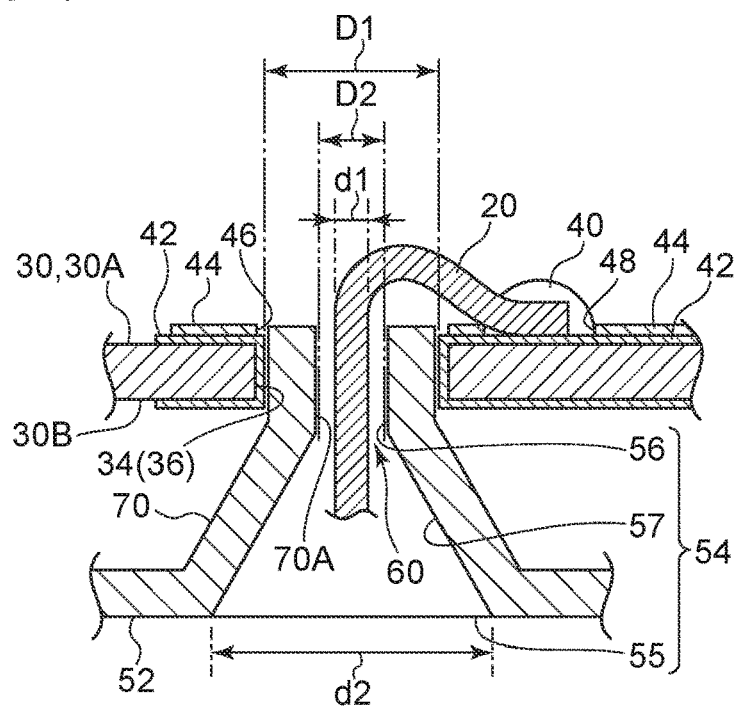
FIG. 4 is a side sectional view illustrating a modification of the guide hole according to an embodiment.

FIG. 3 is a side sectional view illustrating a configuration example of the guide hole 54 in an embodiment. FIG. 4 is a side sectional view illustrating a modification of the guide hole 54 in an embodiment.

In some embodiments, for example, as illustrated in FIGS. 2A, 3, and 4, in the on-vehicle brushless motor device 1 in which the holder 52 includes the guide hole 54, the guide hole 54 may include a tapered passage portion 57 formed to be tapered such that a hole diameter (passage diameter) decreases as a distance from the rotor 12 increases in the axial direction X.

Thus, one end of the coil wire 20 can be smoothly guided to the through hole 34 of the electronic substrate 30 via the tapered passage portion 57. Therefore, it is possible to provide the on-vehicle brushless motor device 1 with improved assemblability. For example, the holder unit 50 on which the electronic substrate 30 is mounted in advance and the coil 18 can be assembled by an automatic assembling apparatus. Thereafter, the electronic substrate 30 and the coil 18 can be electrically connected to each other by soldering.

A motor-side opening end 55, which is an opening end of the guide hole 54 on the brushless motor 10 side, has a diameter sufficiently larger than the diameter of the coil wire 20. For example, as illustrated in FIGS. 3 and 4, for example, the motor-side opening end 55 may be configured to satisfy 3≤d1/d1, where d1 is the diameter of the coil wire 20 and d2 is the diameter of the motor-side opening end 55 (the inner diameter of the motor-side opening end 55). The "diameter of the motor-side opening end 55" means the hole diameter (passage diameter) of the guide hole 54 at the position of the motor-side opening end 55.

In some embodiments, for example, as illustrated in FIGS. 2A, 3, and 4, the guide hole 54 may include a substrate-side passage portion 60 having a passage diameter that is uniform in the axial direction. In the illustrated embodiment, the substrate-side passage portion 60 is configured to connect the substrate-side opening end 56 and the upper end of the tapered passage portion 57.

As a result, when the coil wire 20 guided by the guide hole 54 passes through the substrate-side passage portion 60, it is possible to give upward directivity to the coil wire 20. Therefore, the coil wire 20 can be more easily and smoothly guided toward the through hole 34 of the electronic substrate 30. In another embodiment, the guide hole 54 may have the tapered passage portion 57 extending from the motor-side opening end 55 to the substrate-side opening end 56. That is, the lower end of the tapered passage portion 57 may be the motor-side opening end 55, and the upper end of the tapered passage portion 57 may be the substrate-side opening end 56.

In some embodiments, for example, as illustrated in FIGS. 2A, 3, and 4, the holder 52 may include a cylindrical portion 70 protruding toward the opposite side to the rotor 12.

In this case, at least a part of the guide hole 54 is formed by the inner peripheral surface 70A of the cylindrical portion 70. In this case, the substrate-side opening end 56, which is the upper end of the inner peripheral surface 70A of the cylindrical portion 70, may be disposed below the through hole 34 as illustrated in FIGS. 2A and 3, may be disposed inside the through hole 34, may be disposed flush with the upper surface 30A of the electronic substrate 30 as illustrated in FIG. 4, or may be disposed above the upper surface 30A of the electronic substrate 30. Further, as illustrated in FIG. 4, at least a part of a cylindrical substrate-side portion 70B of the cylindrical portion 70, which forms the substrate-side passage portion 60 on the inner peripheral surface thereof, may be disposed inside the through hole 34.

As illustrated in FIG. 4, by disposing the substrate-side portion 70B of the cylindrical portion 70 inside the through hole 34, the one end of the coil wire 20 can be smoothly guided by the through hole 34 of the electronic substrate 30. Therefore, it is possible to provide the on-vehicle brushless motor device 1 with improved assemblability.

In some embodiments, for example, as illustrated in FIGS. 3 and 4, in the on-vehicle brushless motor device 1 in which the guide hole 54 includes the tapered passage portion 57, a diameter D2 of the substrate-side opening end 56 (an inner diameter of the substrate-side opening end 56) may be smaller than a diameter D1 of the through hole 34. According to the on-vehicle brushless motor device 1 having the above-described structure, the coil wire 20 having passed through the substrate-side opening end 56 may be more easily and smoothly guided to the through hole 34 of the electronic substrate 30. The "diameter of the substrate-side opening end 56" means the hole diameter (passage diameter) of the guide hole 54 at the position of the substrate-side opening end 56.

Figure 5:
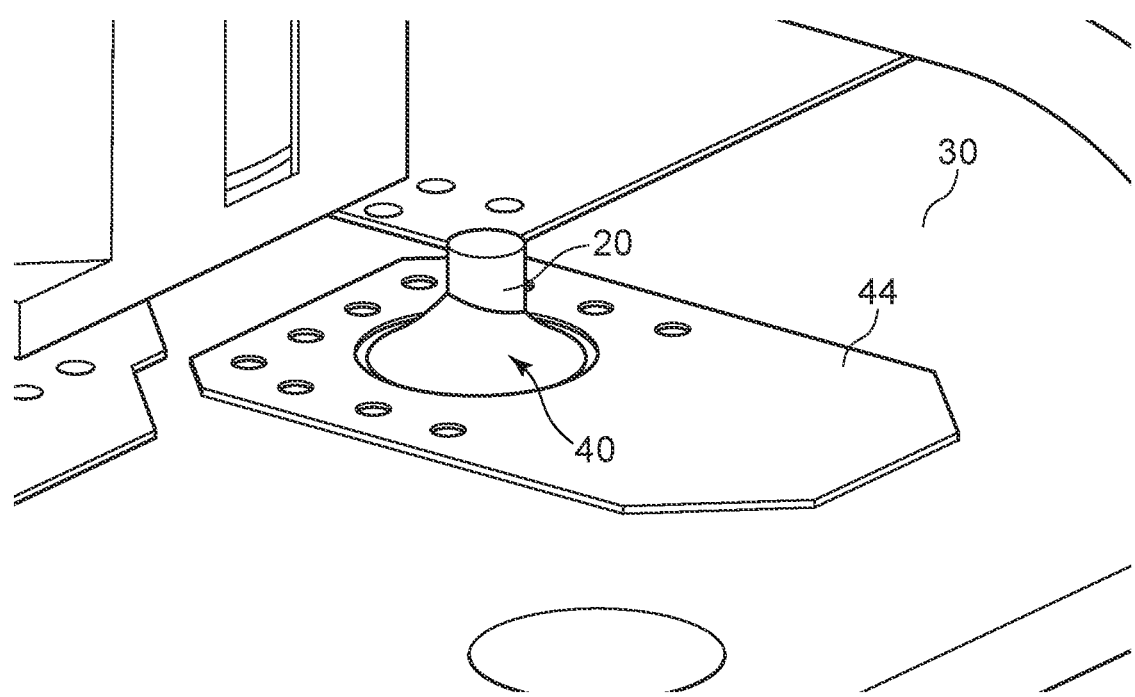
FIG. 5 is a perspective view illustrating a shape of a soldering portion according to an embodiment.

FIG. 5 is a perspective view illustrating the shape of the soldering portion 40 according to an embodiment.

In some embodiments, for example, as illustrated in FIGS. 3 and 5, the soldering portion 40 may be provided to connect the coil wire 20, provided to protrude from the through hole 34 of the electronic substrate 30 on the side opposite to the rotor 12, and the inner peripheral surface 36 of the through hole 34.

For example, the soldering portion 40 may be provided to be filled in a gap between the through hole 34 and the coil wire 20 that protrudes to the upper side of the electronic substrate 30 through the through hole 34 and is disposed such that one end faces upward.

According to the on-vehicle brushless motor device 1, the on-vehicle brushless motor device 1 having the configuration in which the electronic substrate 30 is arranged on the opposite side to the output side of the brushless motor 10 can be realized with a simple configuration. In addition, for example, when the through hole 34 is configured as a through hole, it is possible to obtain the on-vehicle brushless motor device 1 in which a metal foil terminal (for example, a copper foil terminal) in the through hole 34 and the coil wire 20 are connected to each other with a simple configuration.

Figure 6:
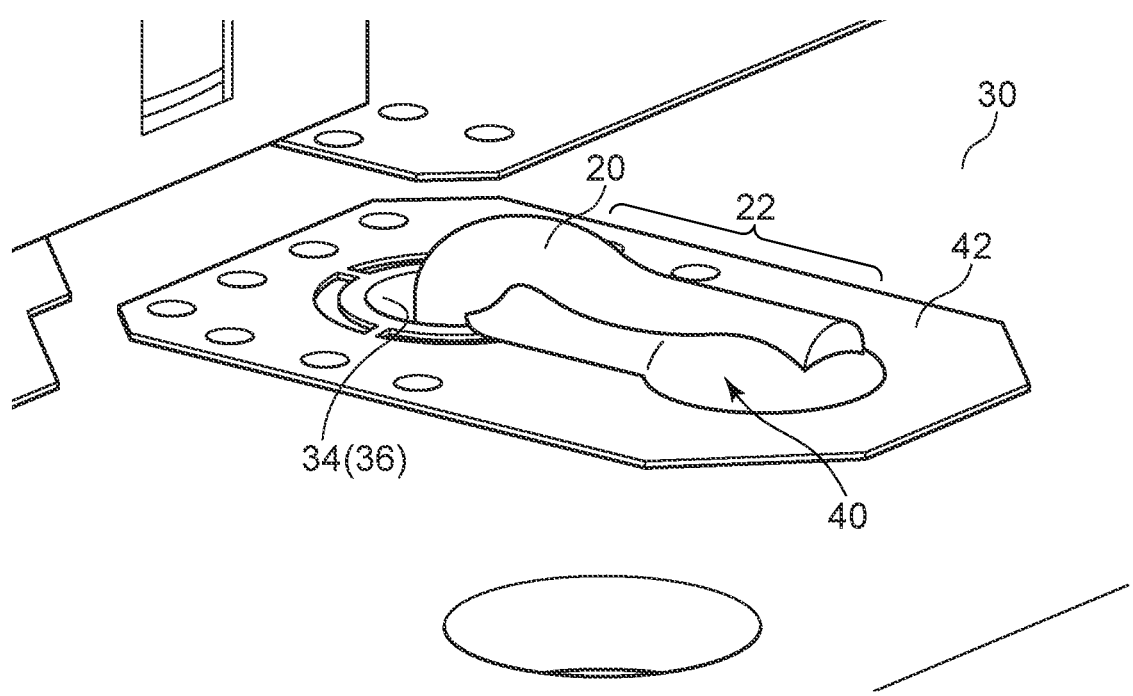
FIG. 6 is a perspective view schematically illustrating a modification of the soldering portion according to an embodiment.

FIG. 6 is a perspective view schematically illustrating a modification of the soldering portion 40 according to an embodiment.

In some embodiments, for example as illustrated in FIG. 6, the electronic substrate 30 includes a metal foil terminal portion 42 disposed adjacent to the through hole 34. The soldering portion 40 may be provided to connect the metal foil terminal portion 42 and the coil wire 20 passing through the through hole 34 and disposed along the metal foil terminal portion 42.

That is, for example, the soldering portion 40 may be provided to connect a horizontally extending portion 22, which is bent in a direction intersecting the axial direction (the horizontal direction in the illustrated form) and extends along the horizontal direction, and the metal foil terminal portion 42 at the one end portion of the coil wire 20 protruding upward relative to the upper surface 30A of the electronic substrate 30. In this case, the soldering portion 40 may be provided to connect a part of the horizontally extending portion 22 and the metal foil terminal portion 42 in the extending direction of the horizontally extending portion 22. The soldering portion 40 may be provided to connect at least the lower portion of the horizontally extending portion 22 and the metal foil terminal portion 42. In the present disclosure, the metal foil terminal portion 42 may be, for example, a copper foil terminal portion.

According to the on-vehicle brushless motor device 1, it is possible to secure a large contact area between the coil wire 20 and the metal foil terminal portion 42, for example, as compared with the above-described embodiment in which one end of the coil wire 20 is disposed facing upward. Therefore, the coil 18 and the electronic substrate 30 can be easily and reliably connected to each other.

Figure 7:
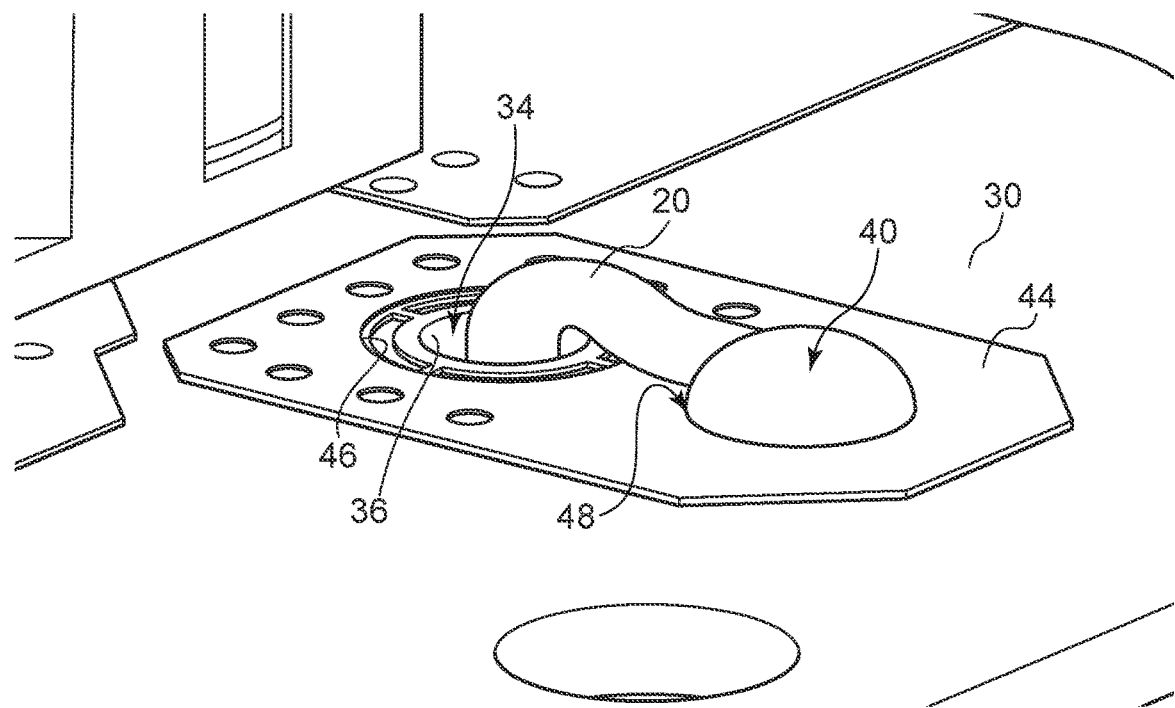
FIG. 7 is a perspective view schematically illustrating a modification of a soldering portion according to an embodiment.

FIG. 7 is a perspective view schematically illustrating a modification of the soldering portion 40 in an embodiment.

In some embodiments, for example, as illustrated in FIGS. 4 and 7, the electronic substrate 30 may include the metal foil terminal portion 42 disposed on a surface (upper surface 30A) of the electronic substrate 30 opposite to the rotor 12, and a resist 44 disposed on the metal foil terminal portion 42. As illustrated in FIG. 4, the metal foil terminal portion 42 may be formed over the upper surface 30A of the electronic substrate 30, the inner peripheral surface of the through hole 34, and the lower surface 30B. The resist 44 illustrated in FIGS. 4 and 7 has a first opening portion 46 through which the coil wire 20 penetrates along the axial direction X, and a second opening portion 48 which is provided separate from the first opening portion 46 and through which part of the metal foil terminal portion 42 is exposed. In this case, the soldering portion 40 is provided to connect the metal foil terminal portion 42 exposed from the second opening portion 48 and the coil wire 20.

In general, during soldering, molten solder spreads or flows in irregular directions, and therefore it is often difficult to accurately form the soldering portion 40 in a desired region. In this regard, in the on-vehicle brushless motor device 1 in which the metal foil terminal portion 42 exposed from the second opening portion 48 of the resist 44 is connected to the coil wire 20, a step is formed along the peripheral edge of the second opening portion 48 due to the thickness of the resist 44. As a result, the melted solder remains in the second opening portion 48, thereby forming the soldering portion 40 having a stable shape. Accordingly, it is possible to effectively suppress waste of solder and poor connection caused by the solder flowing into an unintended region (for example, the inside of the through hole 34).

Next, a method of manufacturing an on-vehicle brushless motor device according to an embodiment of the present disclosure will be described. FIG. 8 is a flowchart illustrating a method of manufacturing an on-vehicle brushless motor device according to an embodiment. As illustrated in FIG. 8, the method of manufacturing the on-vehicle brushless motor device 1 includes step S1 of arranging the electronic substrate 30 along a plane P intersecting the axial direction X on the side opposite to the output side of the brushless motor 10, step S2 of passing the coil wire 20 of the coil 18 constituting the stator 16 of the brushless motor 10 through the through hole 34 of the electronic substrate 30, and step S3 of soldering the coil wire 20 protruding from the through hole 34 to the electronic substrate 30.

In step S1, for example, an electronic substrate 30 on which various electronic components for controlling drive of the brushless motor 10 are mounted is disposed on the upper surface of the holder unit 50 that partitions the space in which the brushless motor 10 is disposed and the space in which the electronic substrate 30 is disposed. At this time, for example, the electronic substrate 30 may be disposed such that the through hole 34 formed in the electronic substrate 30 in advance for allowing the coil wire 20 to pass therethrough and the guide hole 54 formed in the holder unit 50 in advance to guide the coil wire 20 into the through hole 34 overlap each other when viewed in the axial direction X.

In step S2, for example, the one end of the coil wire 20 may be passed through the through hole 34 by guiding the coil wire 20 along the tapered passage portion 57 that is formed in advance in the holder 52 of the holder unit 50, as the guide hole 54, so that the diameter thereof decreases from the lower surface side toward the upper surface side of the holder 52.

In step S3, for example, one end of the coil wire 20 protruding to the upper side of the electronic substrate 30 through the through hole 34 may be disposed such that the one end faces upward, and the soldering portion 40 may be formed to be filled in the gap between the coil wire 20 and the inner peripheral surface 36 of the through hole 34. Alternatively, the coil wire 20 may be disposed along the metal foil terminal portion 42 disposed adjacent to the through hole 34, and soldering may be performed to connect the coil wire 20 and the metal foil terminal portion 42. Further, on the metal foil terminal portion 42 disposed on the upper surface 30A of the electronic substrate 30, the coil wire 20 may be soldered to be connected to the metal foil terminal portion 42 partially exposed from the first opening portion 46 through which the coil wire 20 passes along the axial direction X and the second opening portion 48 provided apart from the first opening portion 46.

According to the method of manufacturing the on-vehicle brushless motor device 1, the electronic substrate 30 arranged on the opposite side to the output side of the brushless motor 10 and the coil wire 20 are directly connected to each other by the soldering portion 40. Therefore, it is possible to reduce the distance between the electronic substrate 30 and the winding portion of the coil 18 as compared with a case where the coil 18 and the electronic substrate 30 are connected to each other via a rigid terminal component such as a terminal pin, and it is possible to provide the on-vehicle brushless motor device 1 which can be miniaturized in the axial direction X. In addition, the number of welding points can be reduced as compared with a case where the coil 18 and the electronic substrate 30 are connected to each other via a rigid terminal component such as a terminal pin. Therefore, the on-vehicle brushless motor device 1 can be easily manufactured.

The present invention is not limited to the above-described embodiments and includes modifications of the above-described embodiments and combinations of these embodiments.

In addition, although the electric oil pump 1A (oil supply device) mounted with the brushless motor 10 has been described as an example of the on-vehicle brushless motor device 1, the on-vehicle brushless motor device 1 of the present disclosure is not limited thereto and can be applied to, for example, an electronically controlled variable valve timing system (VVT), an electric water pump (EWP), a parking lock actuator (PLA), and the like each mounted with the brushless motor 10.

The invention claimed is:

1. An on-vehicle brushless motor device, comprising:
a brushless motor including a rotor and a stator which includes a plurality of coils arranged around the rotor;
an electronic substrate arranged on a side opposite to an output side of the brushless motor along a plane intersecting an axial direction of the rotor;
a soldering portion which connects a coil wire of the coil and the electronic substrate; and
a holder unit including (i) a connector terminal for connecting the electronic substrate and an external device and (ii) a holder disposed between the electronic substrate and the brushless motor to support the electronic substrate, the holder being formed of resin, the connector terminal being integrally formed with the holder by insert-molding.

2. The on-vehicle brushless motor device according to claim 1,
wherein the electronic substrate includes a through hole penetrating the electronic substrate in the axial direction, and
the holder includes a guide hole for guiding the coil wire from a brushless motor side to the through hole of the electronic substrate.

3. The on-vehicle brushless motor device according to claim 2, wherein the guide hole includes a tapered passage portion formed such that a hole diameter decreases as a distance from the rotor increases in the axial direction.

4. The on-vehicle brushless motor device according to claim 3,
wherein the guide hole includes a substrate-side passage portion connecting an opening end of the guide hole on an electronic substrate side and the tapered passage portion, and
the substrate-side passage portion has a passage diameter that is uniform in the axial direction.

5. The on-vehicle brushless motor device according to claim 4,
wherein a diameter of the opening end of the guide hole on the electronic substrate side is smaller than a diameter of the through hole.

6. The on-vehicle brushless motor device according to claim 2,
wherein the soldering portion connects the coil wire arranged to protrude from the through hole of the electronic substrate on a side opposite to the rotor and an inner peripheral surface of the through hole.

7. The on-vehicle brushless motor device according to claim 2,
wherein the electronic substrate includes a metal foil terminal portion disposed adjacent to the through hole, and
the soldering portion connects the metal foil terminal portion and the coil wire passing through the through hole and disposed along the metal foil terminal portion.

8. The on-vehicle brushless motor device according to claim 2,
wherein the electronic substrate includes a metal foil terminal portion disposed on a surface of the electronic substrate opposite to the rotor, and a resist, which is disposed on the metal foil terminal portion, including a first opening portion through which the coil wire penetrates along the axial direction and a second opening portion provided separate from the first opening portion and causing at least a part of the metal foil terminal portion to be exposed therethrough, and
the soldering portion connects the metal foil terminal portion and the coil wire via the second opening portion.

9. A method of manufacturing an on-vehicle brushless motor device, comprising steps of:
arranging an electronic substrate on a side opposite to an output side of a brushless motor along a plane intersecting an axial direction of a rotor of the brushless motor;
arranging a holder unit between the electronic substrate and the brushless motor to support the electronic substrate, the holder unit including a holder formed of resin and a connector terminal integrally formed with the holder by insert-molding;
passing a coil wire of a coil constituting a stator of the brushless motor through a through hole of the electronic substrate;
soldering the coil wire protruding from the through hole to the electronic substrate; and
connecting the electronic substrate with an external device via the connector terminal.

* * * * *